United States Patent [19]
Geib et al.

[11] Patent Number: 5,804,726
[45] Date of Patent: Sep. 8, 1998

[54] ACOUSTIC SIGNATURE ANALYSIS FOR A NOISY ENVIROMENT

[75] Inventors: Richard Carter Geib, Medina; Frank Schossler, Willoughby Hills, both of Ohio

[73] Assignee: MTD Products Inc., Cleveland, Ohio

[21] Appl. No.: 543,711

[22] Filed: Oct. 16, 1995

[51] Int. Cl.$^6$ .............................. G01H 1/08; G01M 13/02
[52] U.S. Cl. ................ 73/593; 73/660; 73/579; 364/551.02
[58] Field of Search ............................ 73/659, 660, 602, 73/609, 610, 611, 612, 613, 579, 649, 570, 584, 593; 364/550, 551.01, 551.02; 340/680

[56] References Cited

U.S. PATENT DOCUMENTS

| | | | |
|---|---|---|---|
| 3,677,072 | 7/1972 | Weichbrodt et al. | 73/593 |
| 3,699,806 | 10/1972 | Weichbrodt | 73/659 |
| 3,842,663 | 10/1974 | Harting et al. | 73/659 |
| 3,857,279 | 12/1974 | Salzer et al. | 73/659 |
| 4,423,634 | 1/1984 | Audenard et al. | 73/587 |
| 4,429,578 | 2/1984 | Darrel et al. | 73/659 |
| 4,550,603 | 11/1985 | Fukada et al. | 73/587 |
| 4,550,604 | 11/1985 | Sugimoto et al. | 73/587 |
| 4,782,452 | 11/1988 | Thomas | 364/550 |
| 4,872,337 | 10/1989 | Watts et al. | 73/162 |
| 4,931,949 | 6/1990 | Hernandez et al. | 364/497 |
| 4,980,844 | 12/1990 | Demjanenko et al. | 364/550 |
| 5,046,362 | 9/1991 | Strubbe | 73/579 |
| 5,109,700 | 5/1992 | Hicho | 73/660 |
| 5,255,565 | 10/1993 | Judd et al. | 73/579 |
| 5,321,365 | 6/1994 | Diamond et al. | 324/603 |
| 5,477,730 | 12/1995 | Carter | 73/609 |
| 5,479,824 | 1/1996 | Torres | 73/602 |

*Primary Examiner*—Hezron E. Williams
*Assistant Examiner*—Richard A. Moller
*Attorney, Agent, or Firm*—Roger D. Emerson

[57] ABSTRACT

A device for testing mechanical devices using acoustic signature analysis of the sonic signature of such devices by filtering out the frequencies of interest, recreating such frequencies from their respective harmonics, and then correlating the recreated frequencies to pre-determined known characteristics or parameters developed from valid devices to predict the long term operability of other unknown devices in a noisy environment like a factory or an airport wherein other sources of sound and/or vibration are present.

25 Claims, 3 Drawing Sheets

ACOUSTIC SIGNATURE ANALYSIS FOR A NOISY ENVIROMENT

FIELD OF THE INVENTION

This invention relates to acoustic signature analysis of devices and things such as transmissions, body structure, frames, industrial machinery, and any other item with a sonic or frequency signature.

BACKGROUND OF THE INVENTION

Frequency analysis has been utilized for many years to ascertain whether or not a particular individual part of a device is within acceptable limits. Examples range from the dispersion analysis of individual jet engine blades to the arc typical truck driver using a baseball bat in order to determine whether or not the pressure within the numerous truck tires are all acceptable. These methods, whether they be sophisticated or archaic, are effective primarily as long as the desired frequency has a sufficient decibel level that it overwhelms surrounding sounds and/or the test is conducted in a isolated chamber which removes extraneous vibrations and sounds. This latter isolation chamber is particularly predominant in noisy factory environments wherein tow truck motors, electric motors, presses, forging machines, conveyors, passersby, and other sources of sound and vibration are present. Typically also the test apparatus is of a specialized design which somehow must be totally reconfigured or even replaced in order to test varying devices or items.

OBJECTS AND SUMMARY OF THE INVENTION

It is the object of this present invention to provide for an acoustic signature analysis of assembled devices or mechanisms.

It is another object of the present invention to reduce the cost of acoustic signature analysis.

It is yet another object of the present invention to allow acoustic signature analysis to occur in a noisy environment such as a factory or an airport.

It is still another object of the present invention to provide for an automatic intuitive testing of mechanical devices.

It is yet a further object of the present invention to utilize the known characteristics of valid devices in order to ascertain the present and future operability status of mechanical devices.

It is a further object of the present invention to allow a concern to identify problem areas in the tested devices prior to any problems therewith.

It is another object of the present invention to allow a concern to institute a long range quality control program based on the initial testing of mechanical devices.

Other objects and a more complete understanding of the invention may be had by referring to the following descriptions and drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

Figure 1:
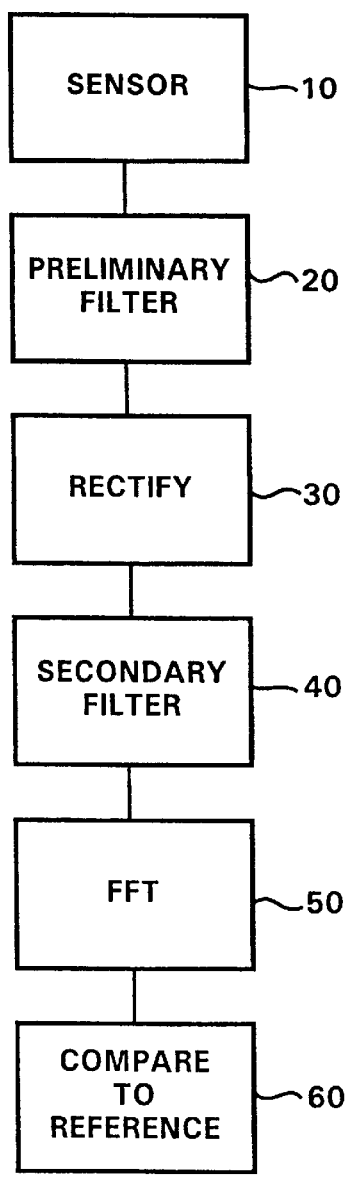
FIG. 1 is a block diagram of the test procedure of this invention.

This invention relates to an acoustic signature analysis device and method, particularly suitable for use in a noisy environment such as a factory. The mechanism will be described in the atmosphere of a test procedure for a MTD transmission having forward and reverse gearing between an input shaft and two output half shifts. This transmission is described in the U.S. Pat. No. 4,903,546, the contents of which are incorporated herein.

The particular preferred embodiment in its basic form is carried out by a test stand including a sensor 10, a preliminary filter 20, a rectifier 30, a secondary filter 40, and a compare to reference means 60.

The sensor 10 is designed to sense and transform any noise and/or vibration from the device or mechanism (here in "device") under test into an electric signal for further operations thereon. It is preferred that the sensor 10 have qualities including frequency bandwidth and range of sensitivity sufficient to produce an output able to be utilized in the rest of the operative procedures. These qualities further could be optimized for a given application even though an uneven signal is resultant.

In the particular preferred embodiment disclosed, the sensor 10 is a calibrated microphone having a 20 hertz to 20 kilohertz frequency range. It should be noted that this particular microphone has a frequency range in excess of that actually utilized by the remaining steps of the test procedure (as later set forth its range could be 500 to 5,000 hertz). The reason for this excess range is to allow the particular preferred test equipment and procedure to be amendable for utilization to test devices other than the particular transmission disclosed in the preferred embodiment. The extra capacity thus is available in the particular embodiment disclosed for testing numerous devices, assemblies and/or mechanical components (again "devices") with minor adaptations by a single testing facility.

In addition to the above sonic requirements, the output from the sensor 10 is first preferably examined for out of range random results in order to discard deviant samples. This override loop is able to ignore random input signals that are the result of extraneous factors such as the general factory environment (tow motors, presses, forging machines et al). Further, there are multiple samples taken for a single device with averaging or combining of samples occurring in order to reduce random noise further. The sensor 10 thus responds to repeating signature with random signals being effectively ignored.

The preliminary filter 20 is utilized to restrict the output of the sensor to frequency ranges related to inherent structural characteristics of the particular device under test. This provides the maximum signal to noise ratio while at the same time minimizing background noise.

The preliminary filter further is utilized to reject frequencies or vibrations which are not necessary for the overall test procedure. For example, in the transmission of the particular preferred embodiment disclosed, it is recognized a frequency range from 500 to 5,000 hertz would be adequate to test the desired parameters of the particular transmission disclosed with a maximum signal to noise ratio while at the same time maximizing background noise immunity.

Further, this is accomplished without locating the sensor and/or transmission under test in an isolated environment. With alternate mechanisms being tested, other frequency bands that might, and would most likely be, appropriate for this filter. This allows for simplified analysis of the signal.

In other devices other parameters may be utilized. For example, in preliminary testing of a washing machine transmission, it was discovered that a cutoff frequency of 1.5 kilohertz would provide the necessary sonic information. In this respect, please note that although a simple filter is described having a single upper and a single lower cutoff frequency, with more sophisticated filters, it would be possible to select multiple cutoff frequencies so as to allow spikes of sonic information at certain very limited frequency ranges related to inherent structural characteristics of complex mechanical systems.

In addition to the above, the preliminary filter is also utilized in order to reduce the requirements and/or cost of the remaining components. For example, a filter of 10 kilohertz would cut off everything above this frequency, thus serving as an anti-aliasing filter for a digital circuit which would only need a 20 kilohertz sampling rate due to this preliminary filter (rather than 40 kilohertz plus otherwise needed for a 20 kilohertz input signal). The filter preferably also eliminates the frequencies which were unnecessary for the analysis of the particular device being analyzed typically high frequencies but could be others.

Note that the filter can be occasioned by a limited bandwidth amplifier (occasioning similar results by not raising the signal level of undesired frequencies) or by alternate means isolating the desired signal components.

Note that the signals necessary for analysis might not be within the frequency bandwidth of ultimate examination. For example, in the preferred embodiment disclosed, the preliminary filter 20 removes frequencies below 500 hertz. However, the harmonics of repeating signals below this cutoff remain on the operative signal. The secondary filter 40 therefor examines the modulation of the available 500 hertz to 5,000 hertz signal to ascertain harmonics and sideband levels in the desired range (0–200 hertz utilized). This use of analysis of what is in effect a higher frequency carrier to determine repeating signals within the desired range thus emphasizes the distinction between the signals necessary for analysis and the signals (which may have to be recreated) that are examined in respect to the desired test parameters. With more sophisticated analysis procedures (like that available in the later described digital embodiment) conversion before examination could be eliminated due to the availability of direct review. Either method forms a harmonic sensing means to sense repeatable signals below the cutoff frequency of the band pass filter.

These signals are either determined theoretically or empirically such as by sampling or which is related to the rotational or vibration components of the device such as a transmission. Ideally, they are the minimum number to test the device, perhaps even reduced in an optimization procedure to the fewest critical signals.

In the specific in the preferred embodiment disclosed, this secondary filter is a 0 to 200 hertz filter, a frequency range which is related to the rotational components of a the transmission under test: for example certain test frequencies—a spur gear frequency range of from 20 to 40 hertz and a bevel gear limit from 160 to 180 hertz (together with a low range and base line limit later described). These frequency ranges were determined by calculating the meshing frequencies of an operating transmission including amplitude limits which were determined by analyzing 100 sample transmissions with a cross check of taking 10 known transmissions to physical failure in subsequent durability testing. This manual procedure, while taking longer to set up the various parameters, was preferred due to the novelty of the present invention. With differing devices, other frequencies might be utilized. In this respect, note that the filter need not pass continuous blocks of frequencies but could instead be optimized to discrete frequencies and limited bandwidths. A digital filter would preferably be utilized for this type of discrete filtering.

After the signal has passed through the secondary filter 40, it is compared to references by means 60. These references are determined in order to provide for the testing of unknown devices while producing results indicative necessary parameters of the construction of such devices. Preferably, these references are sufficiently defined to represent the desired qualities of the device under test. If the device under test is within the limits of the references, it passes the analysis. In the particular preferred embodiment disclosed the signal from the secondary filter 40 is passed through a Fast Fourier Transformation (FFT) to determine the frequency content of the signal. This analysis is specifically designed to look at frequencies which are related to rotating components in the device under test. The particular analysis parameters can be adjusted to provide flexibility.

Figure 3:
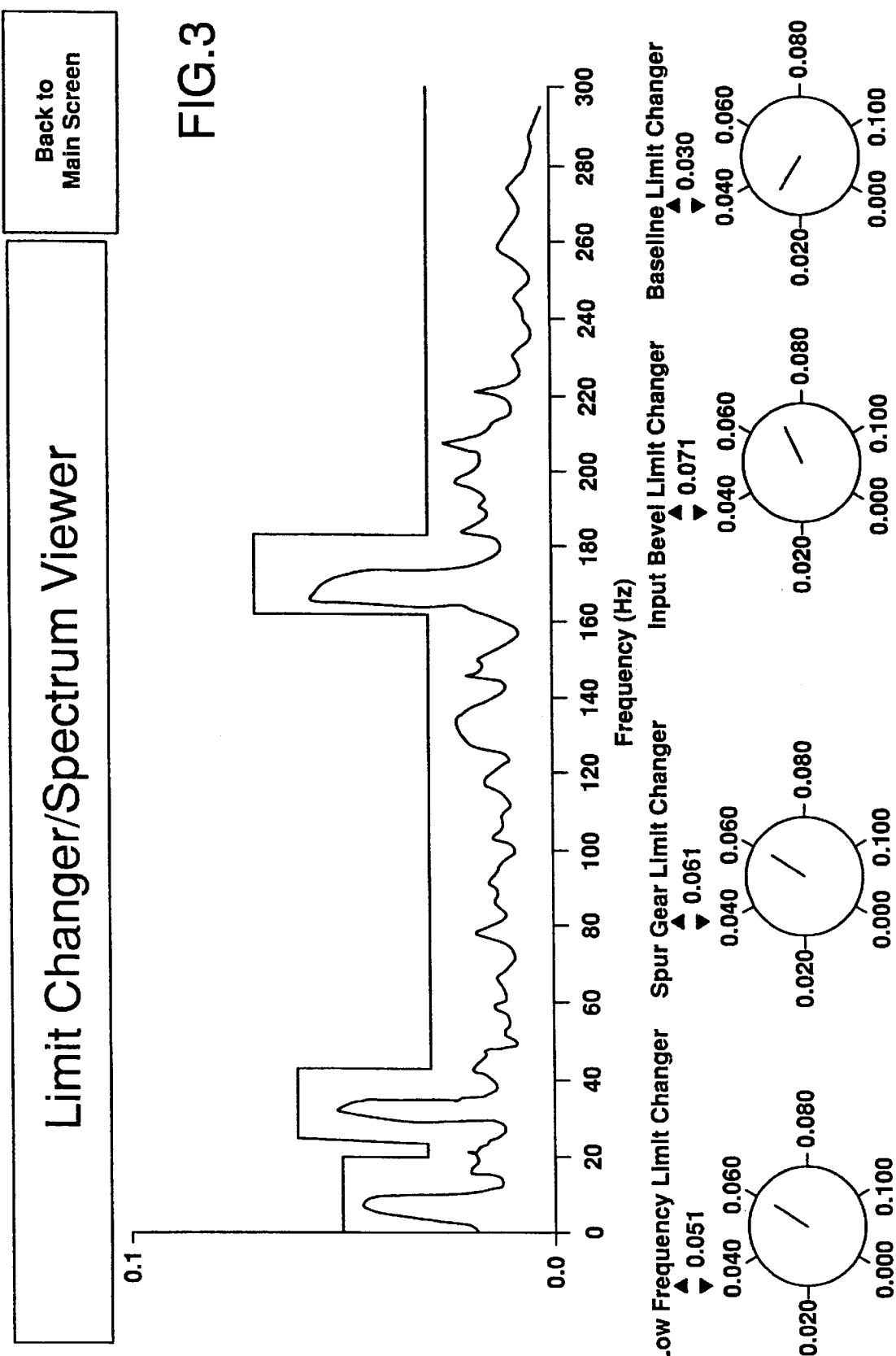
FIG. 3 is a drawing of a typical signature analysis curve for the particular preferred embodiment described in this application.
Figure 4:
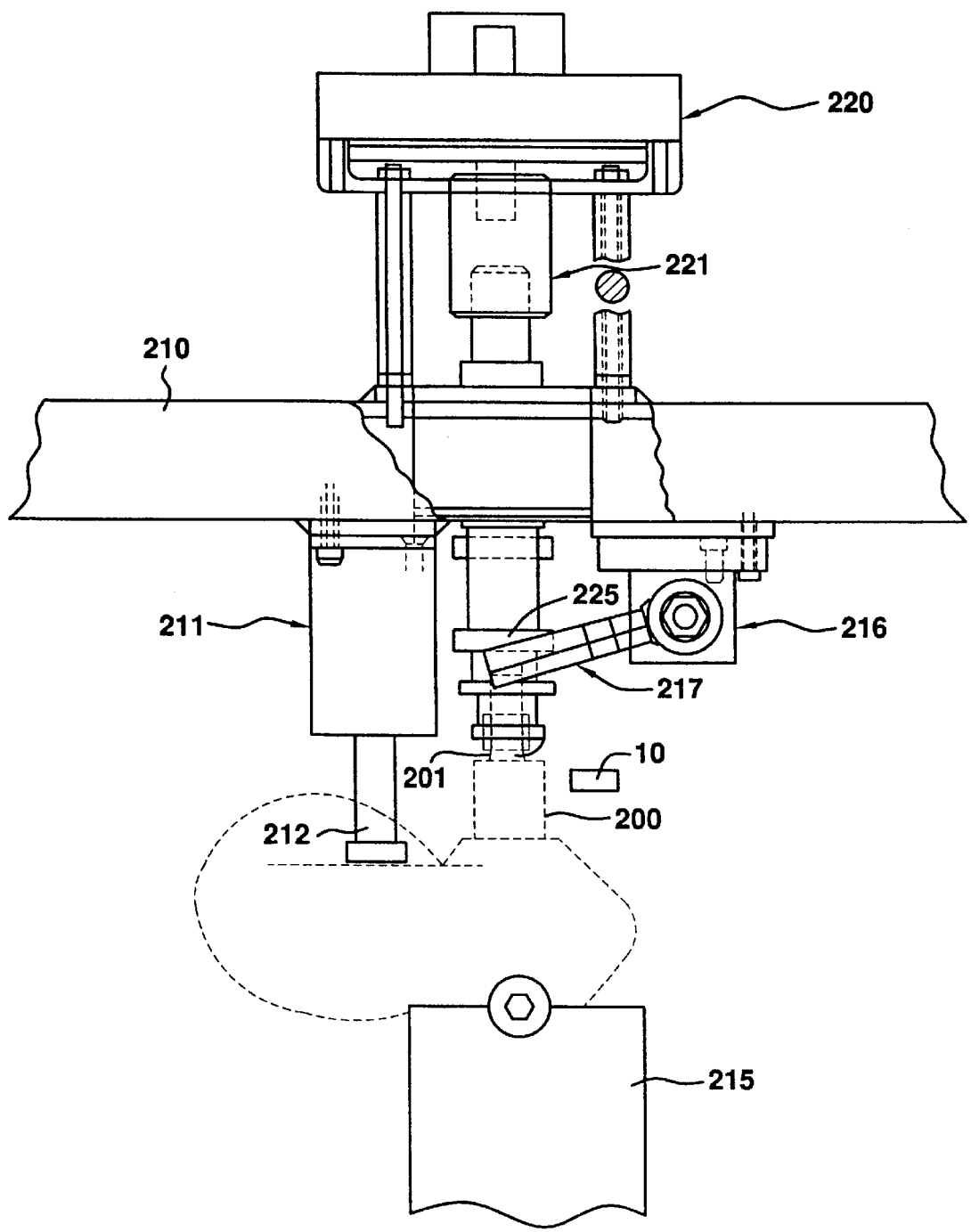
FIG. 4 is a side view of a test stand for the preferred particular embodiment utilized in describing the invention herein.

In the preferred embodiment disclosed, there are four references: these are a) the low frequency limit, b) the spur gear limit, c) the input bevel limit, and d) the base line limit (FIG. 3).

The low frequency limit is used to check the condition of the differential gears and the output shaft of the transmission. The spur gear limit is used to check the condition of the intermediate shaft spur gear. The input bevel limit is used to check the condition of the input bevel gear mesh. The base line limit is used to look at all frequency bands other than the ones described above to provide for an overall noise and vibration limit check. Other numbers and types of limits would be appropriate in testing other devices.

In the preferred embodiment disclosed, the extent of the limits can be modified on line in order to adjust the respective limits in real time. This is preferred in that it allows the manufacturer to change the testing parameters for the device if he so desires or if the facts so warrant. Note that although FIG. 3 shows changeable levels, the bandwidth and center frequency of the test parameters could also be changed. In addition, FIG. 3 shows three frequency centered limits:. any number could in fact be provided—especially in the software driven digital example of FIG. 2.

Figure 2:
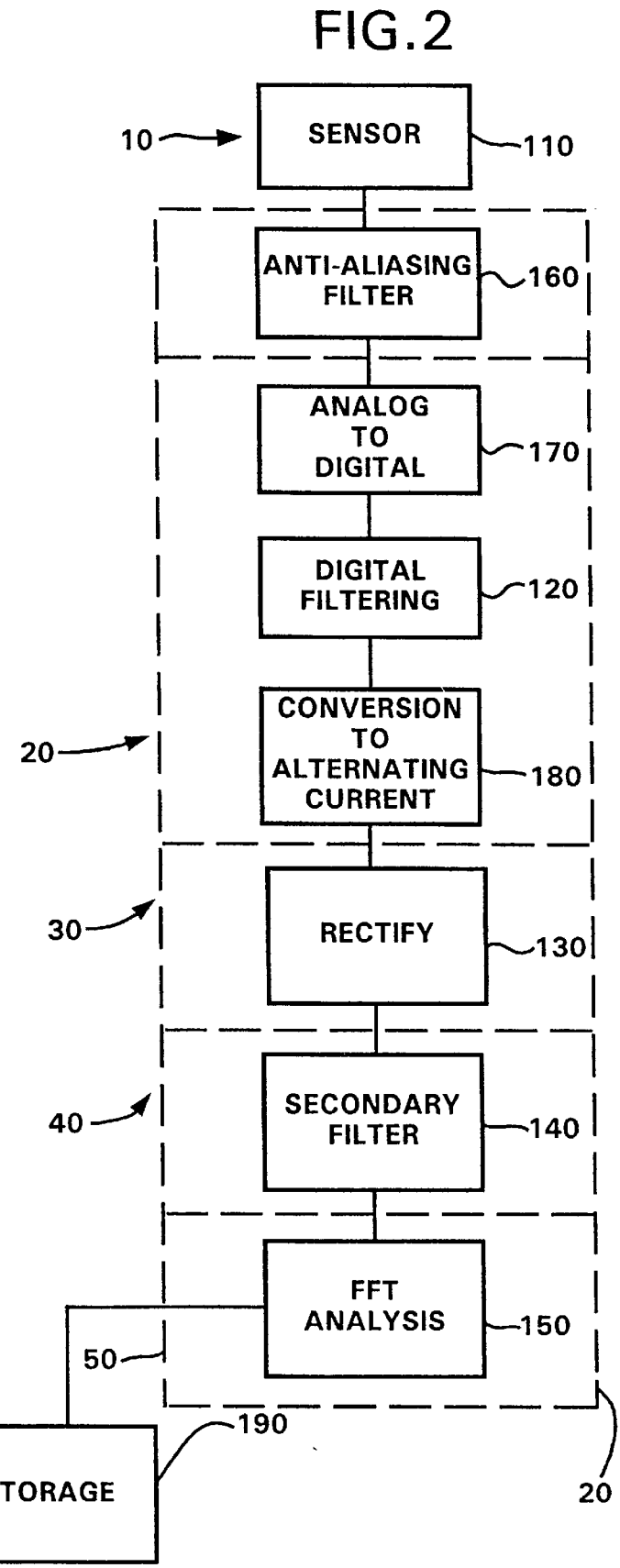
FIG. 2 is an expanded block diagram of the preferred test procedure of the present invention.

The invention can be constructed in either analog or digital form. FIG. 2 discloses an embodiment wherein all of the processing and analysis of the output of the sensor occurs within in a digital form, in the preferred embodiment disclosed, all within a computer 200 (although the parts could be otherwise housed).

This use of a digital computer allows for the invention to be modified for different apparatus through either input of different variables into software (preferred) and/or by reprogramming or replacing the computer software.

In respect to the former, the various parameters could be adjusted from a set of input data which define the parameters for the various procedures of the invention. Examples of this would be the frequencies, levels, and bandwidth of the digital filtering, the extent of the rectification, the limits of the secondary filtering, the parameters of the FFT analysis including the frequencies examined together with their bandwidth and limits. This would allow a single test device to be utilized with the testing of multiple devices and/or mechanical items. This would expand the versatility of a single test device.

In respect to the latter, the software could be rebooted in a program with different parameters (possibly even a different program) to produce optimal results. This again would define the various parameters to optimize the test procedure.

The sensor 110 in the digital version is chosen in order to measure the desired sonic qualities of the device being tested. This has been previously described in respect to sensor 10 of the generic FIG. 1.

From the sensor through the analysis, all of the remaining components of this FIG. 2 are preferably located within the computer 200 (they could be located otherwise including individually also).

These include an anti-aliasing filter 160, an analog to digital converter 170, a digital filtering 120, conversion to alternating current 180, rectification 130, a secondary filter 140, and fast fourier transformation analysis 150.

The anti-aliasing filter 160 is used in the digital format in order to eliminate errors which might occur due to the sampling frequency in respect to input signal frequency (it is not needed in an analog test device). It is preferred that this filter cut off the signal at less than ½ the chosen digital sampling rate in order to avoid this error. In this respect, it is noted that (without very sophisticated state of the art equipment) normally the input frequency(s) necessary to test the device is first determined, then the sampling rate is determined to be over twice this frequency, and only then is the cut off of the anti-aliasing filter determined. The reason for this is that certain signal information must reach the remaining steps—and too low a filter cut off may eliminate some of this information prior to processing. (Note that with a universal test machine, the parameters would preferably be selected or optimized based on the most demanding application for the machine, leaving lesser devices with excess test capability).

In the particular preferred embodiment disclosed, the data is analyzed at a 20 kilohertz sampling frequency and a 12 bit data. The anti-aliasing filter 160 has a corresponding 10 kilohertz cut off frequency.

In the particular embodiment disclosed, the filter 160 is mounted on the interface board between the sensor and the digital data bus and is a module made by Analog Devices. (Note that as previously set forth in fact only 5 kilohertz of signal information is needed. For this reason, a 10 kilohertz sampling frequency and 5 kilohertz anti-aliasing filter could have been utilized to test this particular transmission. However, for adaptability higher frequencies are being utilized). Note also that if the device was processing high frequency information from the sensor 110, for example, 50 kilohertz information, the sampling rate of the computer and the anti-aliasing filter would also have to be adjusted accordingly.

From the anti-aliasing filter 160, the signal passes to an analog to digital converter which converts the analog information into digital data for subsequent processing. The frequency of digital sampling and the amount of bits of data is chosen in view of the overall frequency which need be analyzed. The type of digital sampling is not critical. Pulse width modulation, pulse density modulation, and other digital sampling systems could be utilized, as could various bit schemes such as oversampling.

In the particular example disclosed, the conversion occurs at a straight 20 kilohertz with 12 bit data accuracy. (Again higher than actually needed for the transmission disclosed under test but much less than that that could be provided with alternate digital techniques).

The digital information from the analog to digital converter is filtered by the digital filter 120. As with the preliminary filter 20, this is primarily band pass filtering to filter out undesired signals such as mechanical noise and random noise (mostly frequencies below 500 hertz). The low frequency filtering gets rid of non-repeating or random structural influences such as the test stand, forging equipment, etc. As previously discussed, due to the inherent accuracy of digital filtering, it would be possible to program the digital filter with many very limited bandwidths centered around very specific frequencies in order to more precisely test the desired signals. Further, in respect to this signal, it would be possible to provide frequency shifting in order to reduce the speed (and cost) of subsequent components (i.e. shift a 1,000 hertz bandwidth about a 1 megahertz center frequency to a 1,000 hertz bandwidth about a 20 kilohertz center frequency).

The digitally filtered signal is passed to an alternating current conversion mechanism which serves to remove any DC component on the digital data. The nature and extent of this conversion is not critical as long as the subsequent steps are adjusted accordingly (for example zero base line AC or mid point base line AC).

The alternating current is then rectified. The purposes and advantages of this has been previously been discussed in respect to the rectifier 30 of FIG. 1.

The rectified signal is then passed to a secondary filter 140. This secondary filter performs the same function as the secondary filter 40 of FIG. 1.

The signal from the secondary filter is then passed through fast fourier transformation analysis (FFT) 150. This analysis is specifically designed to look at frequencies which are particularly pertinent to the particular device being tested—in this case load monitoring of a transmission which is not connected except a motor at the input shaft (actual test procedures later described). The particular analysis parameters can again be adjusted so as to provide for suitable testing parameters of the device under test.

A typical test envelope is shown in FIG. 3. As previously set forth, this device includes a low frequency limit, a spur gear limit, an input bevel limit, and a base line limit, all of which can be changed in real time. Further, the particular signal that is then undergoing analysis can be viewed in real time on the spectrum viewer along with the particular limits which have been set for the test machine. Further to the above, in this digital embodiment, all of the test results can be saved in a storage module 190 for future use. This allows the user to acquire, store, and maintain performance data of the devices under test for future reference and/or analysis. It further allows a manufacturer to record an item number for each device in the storage module such that by reference to this item number identification of the device, the particular pertinent test results can be retrieved from storage. In the particular embodiment disclosed, the storage 190 is an optical storage disk. Other forms of storage are also possible.

The invention of the present application is suitable for testing any mechanical or other device which has sonic properties. These include diverse items such as the transmission of a lawn mower (as disclosed in the preferred embodiment), a helicopter main bearing, an entire automobile, steel I beams, roadways, and any other item which has a sonic or frequency signature.

Discussion of the transaxle testing procedure demonstrates the flexibility of the present invention. In the disclosed preferred embodiment, a transaxle 200 is manually or automatically located in position in respect to a test fixture. At this time, a transaxle locking cylinder 211 extends its piston 212 to lock the transaxle 200 in a retention fixture 215. At this time, the spindle actuator 216 lowers the spindle engagement arm 217 so as to couple the input shaft 201 of the transaxle to the electric motor 220 of the text fixture. A coupling 221 allows for the upwards and downwards movement of the spindle 225.

Once the spindle 225 is engaged with the input shaft of the transaxle, the transaxle is shifted into a forward speed. In the preferred embodiment, this would be occasioned by a separate cylinder physically moving the shift rod into its forward position. At this time, the electrical motor 220 is rotated and the sensor 10, located approximately ¼–¾ inches (⅜" shown) from the input shaft bearing, takes its reading in successive or interrupted one second duration data blocks (three preferred). There is a main override loop in this analysis such that if there is an excessive spike in any sample, that particular sample is ignored and a new one occasioned to replace it.

Once the samples are taken in the forward direction, they are averaged with the average compared to a standard as previously discussed. If the forward speed analysis is acceptable, the electric motor stops and the shifting mechanism moves the transaxle 200 shift into its reverse position. At that time, the process is repeated with new samples again averaged and compared to a standard. Note that the standard does not have to be the same standard as used for forward as reverse is utilized different than forward. (In this preferred embodiment, they are the same. In other applications, the standards may vary). Note also, average could include the mean, median, numerical average standard deviation or other parameter indicative of the device's performance relative to the standard.

At the end of this testing, the transaxle locking cylinder 211 retracts thus releasing the transaxle from the retention fixture for automatic or manual removal.

If the transaxle passed both the forward and reverse tests, the transaxle is passed on for incorporation in a lawn and garden tractor.

If the transaxle fails either the forward or reverse analysis, it is removed from the manufacturing line for analysis and possible correction of any difficulties which may exist.

Through life testings of units which passed and failed, the disclosed procedure, it has been ascertained that the test procedure is very accurate in predicting if and when long term difficulties might arise with any given transaxle. Thus, experimental life testing has validated the disclosed invention.

Although the invention has been described in the preferred embodiment with a certain degree of particularity, it is to be understood that numerous changes can be made without deviating from the invention as hereinafter claimed.

We claim:

1. A method for testing a mechanical device comprising the steps of:

locating the mechanical device at a test location;
   operating the mechanical device;
   sensing the sounds and/or vibrations coming from the mechanical device with a sensor;
   filtering a signal from said sensor with a filter to highlight important frequencies;
   rectifying a signal from said filter;
   ascertaining harmonies and sideband levels of repeating signals previously filtered with a secondary filter; and,
   comparing a signal from said secondary filter to a reference with comparing means in order to ascertain the operability status of the mechanical device.

2. The method of claim 1 wherein said step of sensing the sounds and/or vibrations coming from the mechanical device with a sensor, includes multiple sound and/or vibration samples taken from the mechanical device.

3. The method of claim 1 wherein said signal from said secondary filter is optimized to discreet frequencies and limited band widths.

4. A method for testing a mechanical device comprising the steps of:

locating the mechanical device at a test location;
   sensing sounds and/or vibrations coming from the mechanical device with a sensor;
   discarding random non-repeating sounds and/or vibrations;
   ascertaining harmonics and sideband levels of repeating signals previously filtered with a secondary filter; and,
   comparing non-discarded output of said sensor to a reference with comparing means in order to ascertain the operability status of the mechanical device.

5. The method of claim 4 wherein, after the step of sensing sounds and/or vibrations coming from the mechanical device with a sensor, the method comprises the step of:

filtering signals from said sensor to highlight important frequencies.

6. The method of claim 4 wherein said step of sensing sounds and/or vibrations coming from the mechanical device with a sensor, includes multiple sound and/or vibration samples taken from the mechanical device, before the step of comparing non-discarded output of said sensor to a reference in order to ascertain the operability status of the mechanical device, the method comprises the step of:

averaging said multiple sound and/or vibration samples.

7. The method of claim 4 wherein said sounds and/or vibrations are sensed indirectly by their modulating harmonics.

8. The method of claim 4 wherein said reference includes multiple parameters.

9. The method of claim 4 wherein, after the step of sensing sounds and/or vibrations coming from the mechanical device with a sensor, the method comprises the step of:

rectifying a signal from said sensor.

10. A method for testing a mechanical device comprising the steps of:

locating the mechanical device at a test location;
   operating the mechanical device;
   sensing sounds and/or vibrations coming from the mechanical device with a sensor;
   discarding random non-repeating sounds and/or vibrations;
   filtering a signal from said sensor to highlight important frequencies;
   rectifying a signal from said filter with a rectifier;
   ascertaining harmonics and sideband levels of repeating signals previously filtered with a secondary filter; and, comparing a signal from said rectifier to a reference with comparing means in order to ascertain the operability status of the mechanical device.

11. The method of claim 10 wherein said step of sensing sounds and/or vibrations coming from the mechanical device with a sensor, includes multiple sound and/or vibration samples taken from the mechanical device.

12. The method of claim 10 wherein,
said secondary filter is optimized to discreet frequencies and limited bandwidths.

13. An apparatus for testing a mechanical device at a test location, the apparatus comprising:
means for operating the mechanical device;
means for sensing sounds and/or vibrations coming from the mechanical device with a sensor;
means for filtering a signal from said sensor to highlight important frequencies;
means for rectifying a signal from said means for filtering;
means for ascertaining harmonics and sideband levels of repeating signals previously filtered and examining important frequencies with a secondary filter; and,
means for comparing a signal from said secondary filter to a reference in order to ascertain the operability status of the mechanical device.

14. The apparatus of claim 13, wherein said means for sensing sounds and/or vibrations coming from the mechanical device with a sensor includes multiple sound and/or vibration samples taken from the mechanical device.

15. The apparatus of claim 13 wherein said secondary filter is optimized to discreet frequencies and limited bandwidths.

16. An apparatus for testing a mechanical device at a test location, the apparatus comprising:
means for sensing sounds and/or vibrations coming from the mechanical device with a sensor;
an override loop for discarding random non-repeating sounds and/or vibrations;
a secondary filter for ascertaining harmonics and sideband levels of repeating signals previously filtered; and,
means for comparing non-discarded output of said sensor to a reference in order to ascertain the operability status of the mechanical device.

17. The apparatus of claim 16 further comprising:
means for filtering a signal from said sensor to highlight important frequencies.

18. The apparatus of claim 16 wherein multiple sound and/or vibration samples are taken from the mechanical device, the apparatus further comprising:
means for averaging said multiple sound and/or vibration samples.

19. The apparatus of claim 16 wherein said sounds and/or vibrations are sensed indirectly by their modulating harmonics.

20. The apparatus of claim 16 wherein said reference includes multiple parameters.

21. The apparatus of claim 16 further comprising:
means for rectifying a signal from said sensor.

22. An apparatus for testing a mechanical device at a test location, the apparatus comprising:
means for operating the mechanical device;
means for sensing sounds and/or vibrations coming from the mechanical device with a sensor;
means for discarding random non-repeating sounds and/or vibrations;
a filter for filtering a signal from said sensor to highlight important frequencies;
a secondary filter for examining said important frequencies from said filter and for ascertaining harmonics and sideband levels of repeating signals previously filtered; and,
means for comparing a signal from said secondary filter to a reference in order to ascertain the operability status of the mechanical device.

23. The apparatus of claim 22 wherein said means for sensing sounds and/or vibrations coming from the mechanical device with a sensor includes multiple sound and/or vibration samples taken from the mechanical device.

24. The apparatus of claim 22 wherein said secondary filter is optimized to discreet frequencies and limited bandwidths.

25. An improvement for a method for testing mechanical devices comprising the steps of:
operating a device having a certain desired range of sounds and/or vibrations;
sensing the sounds and/or frequencies coming from the device with a sensor to produce a signal;
filtering said signal coming from said sensor to filter out said certain desired sounds and/or frequencies; and,
using a secondary filter to ascertain harmonics and sideband levels of repeating signals previously filtered.

* * * * *